(12) United States Patent
MacDonald

(10) Patent No.: US 12,416,539 B2
(45) Date of Patent: Sep. 16, 2025

(54) MANIFOLD WITH INTER-OPENING FEATURES FOR USE WITH A PRESSURE TRANSMITTER

(71) Applicant: R.J. MACHINE COMPANY, INC., Marble Falls, TX (US)

(72) Inventor: Linda MacDonald, Marble Falls, TX (US)

(73) Assignee: R.J. MACHINE COMPANY, INC., Marble Falls, TX (US)

(*) Notice: Subject to any disclaimer, the term of this patent is extended or adjusted under 35 U.S.C. 154(b) by 267 days.

(21) Appl. No.: 18/184,654

(22) Filed: Mar. 15, 2023

(65) Prior Publication Data

US 2023/0296462 A1     Sep. 21, 2023

Related U.S. Application Data

(60) Provisional application No. 63/320,450, filed on Mar. 16, 2022.

(51) Int. Cl.
*G01L 19/00*     (2006.01)

(52) U.S. Cl.
CPC .................. *G01L 19/003* (2013.01)

(58) Field of Classification Search
CPC ................ G01L 19/147; G01L 9/0072; G01L 19/0645; G01L 19/0084; G01L 13/025;
(Continued)

(56) References Cited

U.S. PATENT DOCUMENTS

| 4,602,657 A | * | 7/1986 | Anderson, Jr. ..... G01L 19/0015 73/1.61 |
| 5,277,224 A | * | 1/1994 | Hutton ................ G01L 19/0015 137/884 |
| 5,709,247 A | * | 1/1998 | Hutton ................ G01L 19/0015 137/884 |

(Continued)

FOREIGN PATENT DOCUMENTS

| CA | 2239492 C | * | 11/2006 | .......... F15B 13/0814 |
| CA | 2347035 C | * | 2/2008 | .......... F16K 27/003 |
| EP | 0866959 B1 | * | 1/2000 | |
| WO | WO-9722867 A1 | * | 6/1997 | .......... F15B 13/0814 |

OTHER PUBLICATIONS

Parker P3M5S™, P4M5S™, P6M5S™ 5-Valve Soft Seat Manifold brochure, 8 pages (2014).
(Continued)

*Primary Examiner* — Andre J Allen
(74) *Attorney, Agent, or Firm* — Rodney J. Fuller; Fuller IP Law LLC

(57) ABSTRACT

A manifold, a method of making the manifold, and a system for measuring pressure within a fluid flowline, in which the manifold may comprise a manifold body having a first end and a second end. A first fluid conduit and a second fluid conduit may extend through the manifold body and each have an inlet for coupling to a fluid flowline and an outlet for coupling to a pressure transmitter. First and second isolation valve bores may be in fluid communication with the first and second fluid conduits, respectively. A first equalizing bore may be in fluid communication with at least one of the first and second fluid conduits. The inlet openings may be spaced from each other by a first inter-opening distance, and the outlet openings may be spaced from each other by a second inter-opening distance, the first inter-opening distance being different from the second inter-opening distance.

20 Claims, 16 Drawing Sheets

(58) Field of Classification Search
CPC .......... G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/00; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

| | | | | |
|---|---|---|---|---|
| 6,009,758 | A | * | 1/2000 | Petrich ................ G01L 19/0015 73/756 |
| 2001/0039964 | A1 | * | 11/2001 | Gul ..................... G01L 19/0015 137/557 |

OTHER PUBLICATIONS

Parker 5 Valve Soft Seat Manifold P3M5S™, P4M5S™, P6M5S™ brochure, 12 pages (2017).

* cited by examiner

MANIFOLD WITH INTER-OPENING FEATURES FOR USE WITH A PRESSURE TRANSMITTER

RELATED APPLICATION

This application claims the benefit of U.S. provisional patent application 63/320,450, filed Mar. 16, 2022 titled "Manifold for Use with a Pressure Transmitter," the entirety of the disclosure of which is hereby incorporated by this reference.

TECHNICAL FIELD

The technical field generally relates to manifolds for coupling a pressure transmitter to a fluid flowline.

BACKGROUND

Pressure transmitters (also known as "pressure transducers") are mechanical devices that measure the expansive force of a fluid. Pressure transmitters are widely used in a number of applications to measure fluid pressure inside fluid flowlines. For example, in the oil or natural gas industries, pressure transmitters may be used to measure pressure inside pipelines or other pressure sensitive equipment to determine the volumetric flow rate of the fluid therein.

Pressure transmitters are typically coupled to the fluid flowline using a manifold which includes one or more valves used to control the passage of fluid between the fluid flowline and the pressure transmitter. In particular, 5-valve natural gas manifolds incorporating two isolation valves, two equalizing valves and a vent valve are well known in natural gas applications. Conventional 5-valve natural gas manifolds comprise inlet openings spaced from each other a distance of 2½ inches and corresponding outlet openings spaced from each other a similar distance thereby requiring a compatible pressure transducer.

SUMMARY

According to one aspect, there is provided a manifold comprising a manifold body having a first end and a second end, a first fluid conduit and a second fluid conduit extending through the manifold body and each having an inlet for coupling to a fluid flowline and an outlet for coupling to a pressure transmitter, first and second isolation valve bores in fluid communication with the first and second fluid conduits, respectively, and a first equalizing bore in fluid communication with at least one of the first and second fluid conduits, wherein the inlet openings are spaced from each other by a first inter-opening distance, and the outlet openings are spaced from each other by a second inter-opening distance, the first inter-opening distance being different from the second inter-opening distance.

In some implementations, the first inter-opening distance may be greater than the second inter-opening distance and each of the first and second fluid conduits may comprise an inlet-side conduit segment extending form the first end, the inlet-side conduit segments being parallel to each other, and an outlet-side conduit segment that extends toward the second end, the outlet-side conduit segments being angled inwardly toward each other. The first fluid conduit may be a mirror image of the second fluid conduit and the outlet-side conduit segments may be angled towards each other at an angle being between 160° and 170°. Each of the first and second isolation valve bores may communicate with the inlet-side conduit segment of the respective first fluid conduit and the second fluid conduit. Moreover, the first and second isolation valve bores may extend through and beyond the inlet-side conduit segment of the respective first fluid conduit and the second fluid conduit and into the manifold body. The manifold may further comprise first and second plug bores in fluid communication with the outlet-side conduit segment of the respective first fluid conduit and the second fluid conduit.

In some implementations, each of the first and second fluid conduits may extend along a straight line between the inlet openings and the outlet openings. The manifold may further comprise a second equalizing bore in fluid communication with at least one of the first and second fluid conduits, a vent bore in fluid communication with the first and second equalizing bores, and a vent aperture in fluid communication with the vent bore.

In some implementations, the first isolation valve bore and the first plug bore may extend into the manifold body from a first same face of the manifold body, and the second isolation valve bore and the second plug bore may extend into the manifold body from a second same face of the manifold body that is opposed to the first same face. The first and second isolation valve bores may be located proximate to the first end of the manifold body that is an inlet end, and the first and second plug bores may be located proximate to the second end of the manifold body that is an outlet end.

In accordance with another aspect, there is provided a method of measuring pressure within a fluid flowline, the method comprising utilizing the manifold as described above coupled to the fluid flowline and at least one pressure transmitter, wherein inlet flowlines are respectively coupled to the inlet openings, outlet fluid flowlines are respectively coupled directly to the outlet openings without an adapter between the outlet openings and the outlet fluid flowlines, and the outlet fluid flowlines are in fluid communication with the pressure transmitter.

In accordance with yet another aspect, there is provided a method of manufacturing a manifold, the method comprising providing a manifold body, and boring a first fluid conduit and a second fluid conduit through the manifold body, wherein boring the first and second fluid conduits comprises boring first and second parallel inlet-side conduit segments into a flowline-side body face of the manifold body, and boring first and second angled outlet-side conduit segments into a transmitter-side body face of the manifold body to intersect the first and second parallel inlet-side conduit segments.

In some implementations, the method may further comprise boring first and second isolation valve bores to fluidly communicate with the first and second parallel inlet-side conduit segments, respectively. The method may further comprise boring first and second plug bores to fluidly communicate with the first and second angled outlet-side conduit segments, respectively, and boring the first and second angled outlet-side conduit segments comprises boring the first and second angled outlet-side conduit segments away from each other.

In accordance with another aspect still, there is provided a system for measuring pressure within a fluid flowline, the system comprising the manifold as described above, inlet flowlines respectively coupled to the inlet openings of the manifold for providing fluid thereto, and outlet fluid flowlines respectively coupled directly to the outlet openings of the manifold without an adapter therebetween, the outlet fluid flowlines being in fluid communication with the pressure transmitter for providing fluid thereto.

DETAILED DESCRIPTION

Figure 1:
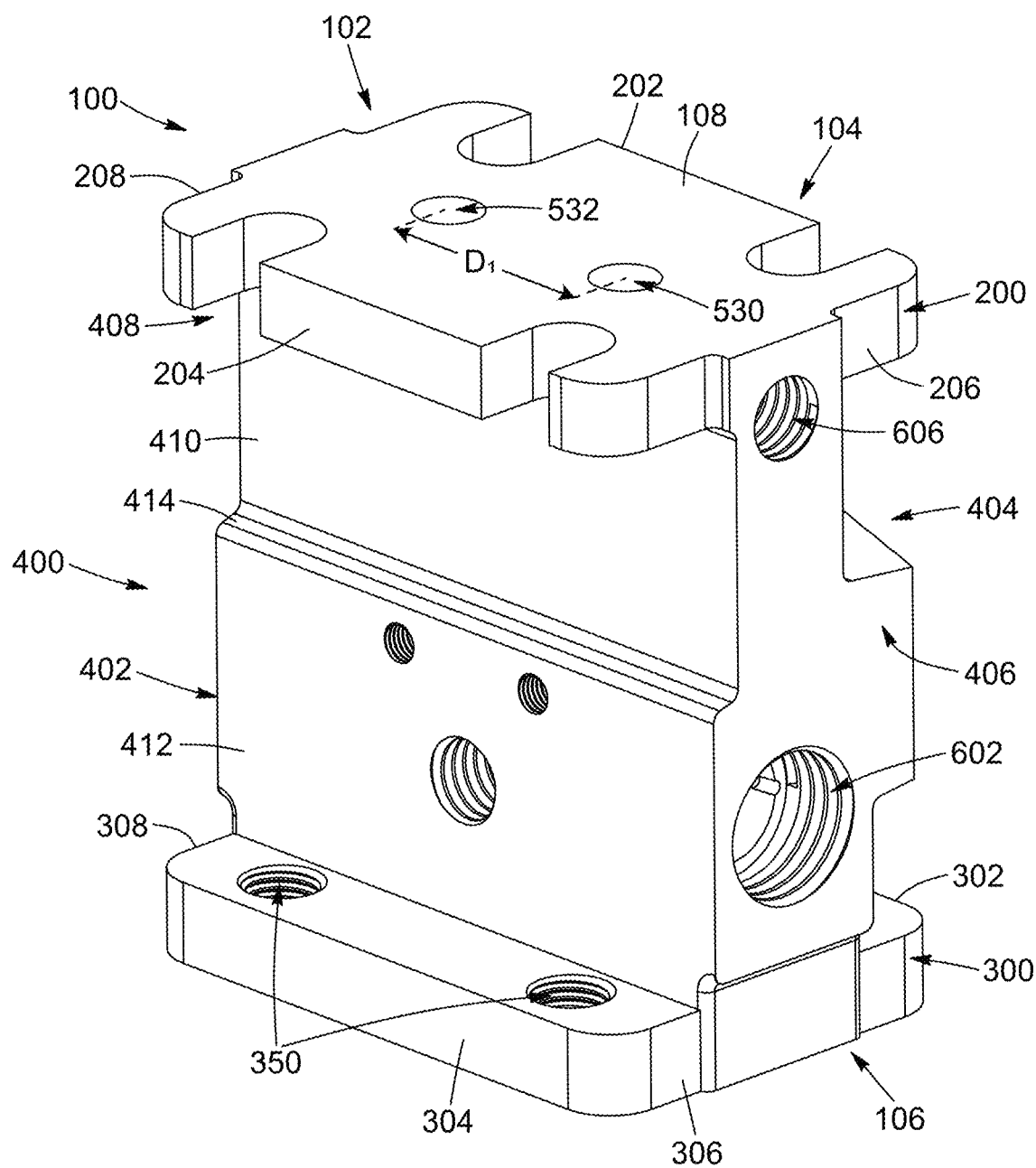
FIG. 1 is a top, first side perspective view of a manifold for use with a pressure transmitter, in accordance with one embodiment.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Furthermore, in the context of the present description, it will be considered that all elongated objects will have an implicit "longitudinal axis" or "centerline", such as the longitudinal axis of a shaft for example, or the centerline of a biasing device such as a coiled spring, for example, and that expressions such as "connected" and "connectable", "secured" and "securable", "engaged" and "engageable", "installed" and "installable" or "mounted" and "mountable", may be interchangeable, in that the present manifold body also relates to kits with corresponding components for assembling a resulting fully-assembled and fully-operational manifold.

It is to be understood that the phraseology and terminology employed herein is not to be construed as limiting and are for descriptive purpose only. The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description above.

Moreover, components of the manifold and/or steps of the method(s) described herein could be modified, simplified, altered, omitted and/or interchanged, without departing from the scope of the present disclosure, depending on the particular applications which the present manifold is intended for, and the desired end results, as briefly exemplified herein and as also apparent to a person skilled in the art.

Moreover, although the present invention was primarily designed for connecting a fluid flowline to a pressure transmitter, it may be used with other objects and/or in other types of applications, as apparent to a person skilled in the art.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

Referring to FIGS. 1 to 11, there is shown a manifold 100 for use with a pressure transmitter (not shown). The manifold 100 is usable to couple the pressure transmitter to a fluid flowline (not shown) carrying pressurized fluid, such as a pipeline, and provide fluid communication between the pressure transmitter and the fluid flowline to allow the pressure transmitter to be used to measure fluid pressure or any other relevant parameter of fluid in the fluid flowline.

In the illustrated embodiment, the manifold 100 includes a manifold body 102 which extends between a first end 104 and a second end 106. In one embodiment, the first end 104 is connectable to the pressure transmitter and the second end 106 is connectable to the fluid flowline.

Specifically, the manifold body 102 includes a transmitter-side body face 108 located at the first end 104 and configured to interface with a corresponding face of the pressure transmitter, and a flowline-side body face 110 located at the second end 106 and configured to interface with a corresponding face of the fluid flowline.

In the illustrated embodiment, the transmitter-side and flowline-side body faces 108, 110 are planar to extend respectively against the corresponding faces of the pressure transmitter and of the fluid flowline which are also planar. In other embodiments, the transmitter-side and flowline-side body faces 108, 110 may not be fully planar and could instead include one or more recess, raised portion, concavely or convexly curved portion, or have any other configuration that would be suitable to interface with the corresponding face of the pressure transmitter and of the fluid flowline. In other embodiments still, the transmitter-side and flowline-side body faces 108, 110 may comprise any shape suitable for fluidly connecting to one or more conduits, the one or more conduits being in fluid communication with one of the pressure transmitter and the fluid flowline.

In the illustrated embodiment, the transmitter-side and flowline-side body faces 108, 110 extend substantially parallel to each other but alternatively, the transmitter-side and flowline-side body faces 108, 110 could instead be angled relative to each other.

In the illustrated embodiment, the manifold body 102 includes a transmitter-side flange 200 located at the first end 104, a flowline-side flange 300 located at the flowline-side end 106 and a central body portion 400 extending between the transmitter-side and flowline-side flanges 200, 300. The transmitter-side flange 200 is substantially rectangular and includes first and second long sides 202, 204 and first and second short sides 206, 208 that extend parallel to each other and perpendicular to the first and second long sides 202, 204. The transmitter-side body face 108 of the manifold body 102 is defined on the transmitter-side flange 200 and extends between the sides 202, 204, 206, 208 of the top flange 200. Alternatively, the transmitter-side flange 200 could instead have any other shape that would be suitable for connection to the pressure transmitter.

The flowline-side flange 300 is also substantially rectangular and includes first and second long sides 302, 304 and first and second short sides 306, 308 that extend parallel to each other and perpendicular to the first and second long sides 302, 304. The flowline-side body face 110 of the manifold body 102 is defined on the flowline-side flange 300 and extends between the sides 302, 304, 306, 308 of the flowline-side flange 300. Alternatively, the flowline-side flange 300 could instead have any other shape that would be suitable for connection to the fluid flowline.

In the illustrated embodiment, the transmitter-side and flowline-side flanges 200, 300 are substantially similarly shaped and have substantially the same footprint. Specifically, the transmitter-side flange 200 has a width $W_1$, defined as a distance between the long sides 202, 204 of the transmitter-side flange 200, which is substantially equal to a width W2 of the flowline-side flange 300, defined as a distance between the long sides 302, 304 of the flowline-side flange 300. Similarly, the transmitter-side flange 200 has a length $L_1$, defined as a distance between the short sides 206, 208 of the transmitter-side flange 200, which is substantially equal to a length $L_2$ of the flowline-side flange 300, defined as a distance between the short sides 306, 308 of the flowline-side flange 300.

In the illustrated embodiment, the transmitter-side flange 200 includes a plurality of connection portions 250 that allow the manifold body 102 to be secured to the pressure transmitter. Specifically, the plurality of connection portions 250 includes four fastener-receiving openings 252 defined in the transmitter-side flange 200. Each fastener-receiving opening 252 is sized, shaped and positioned to receive a fastener—such as a bolt or the like—which engages the pressure transmitter to secure the pressure transmitter to the manifold 100.

As best shown in FIGS. 1 to 4, in the illustrated embodiment, each fastener-receiving opening 252 is shaped as a notch 254 defined in a corresponding long side 202, 204 of the transmitter-side flange 200. The notch 254 includes an end portion 256 which is spaced from the corresponding long side 202, 204 of the transmitter-side flange 200 and a neck portion 258 which extends between the end portion 256 and the corresponding long side 202, 204.

It will be appreciated that providing notches 254 instead of closed-side openings that would completely encircle a fastener extending through the opening may allow more flexibility during the manufacturing of the manifold: while closed-side openings would require the openings to be precisely positioned in alignment with corresponding fastener-receiving holes in the pressure transmitter, the notches 254 allow the fasteners to engage the manifold body 102 even if the fasteners are spaced slightly from the end portion 256 of the notches 254. The notches would also allow the fasteners to be slid laterally into the notches through the neck portion if desired.

The flowline-side flange 300 further includes a plurality of connection portions 350 that allow the manifold body 102 to be secured to the fluid flowline. In the illustrated embodiment, the connection portions 350 include four threaded openings for receiving corresponding threaded fasteners. Alternatively, the connection portions 350 could instead include notches similar to the notches 254.

Referring now to FIGS. 8 to 11, the manifold 100 further includes a plurality of fluid conduits 500, 502 for allowing passage of fluid from the fluid flowline to the pressure transmitter. The fluid conduits 500, 502 extend through the central body portion 400 and the flanges 200, 300 between first and second ends 104, 106 of the manifold body 102, and more specifically between the transmitter-side and flowline-side body faces 108, 110. Specifically, the manifold 100 includes a plurality of inlet openings 520, 522 defined on the flowline-side body face 110 and a plurality of outlet openings 530, 532 defined on the transmitter-side body face 108. In the illustrated embodiment, the inlet openings include first and second inlet openings 520, 522 and the outlet openings include first and second outlet openings 530, 532. Still in the illustrated embodiment, the plurality of conduits 500, 502 includes a first fluid conduits 500, 502 extending between the first and second ends of the manifold body 102.

In the illustrated embodiment, the inlet openings 520, 522 and the outlet openings 530, 532 are substantially located in a common transversal plane. Specifically, the center of the inlet openings 520, 522 and the center of the outlet openings 530, 532 are located in a transversal plane $P_1$ which extends substantially parallel to the long sides 202, 204, 302, 304 of the transmitter-side and flowline-side flanges 200, 300 and is located substantially midway between the long sides 202, 204 of the transmitter-side flange 200 and between the long sides 302, 304 of the flowline-side flange 300. The fluid conduits 500, 502 further extend on this transversal plane $P_1$.

In the illustrated embodiment, each fluid conduit 500, 502 has a substantially circular cross-section, and therefore each one of the inlet openings 520, 522 and the outlet openings 530, 532 are also substantially circular. Alternatively, each fluid conduit 500, 502 may have a differently-shaped cross-section and each one of the inlet and outlet openings could have a correspondingly-shaped cross-section.

In the illustrated embodiment, the first and second fluid conduits 500, 502 further have a constant cross-section along their entire length. Specifically, the first and second fluid conduits 500, 502 remain substantially circular along their entire length and have a constant diameter—and therefore a constant cross-sectional area—along their entire length. In one embodiment, the first and second fluid conduits 500, 502 have a diameter of less than about 1 inch, or specifically of between about ¼ inch and ½ inch, or more specifically of about ⅜ inch. Alternatively, the first and second conduits could have any other suitable diameter or vary in diameter along the length of the conduits 500, 502.

Figure 2:
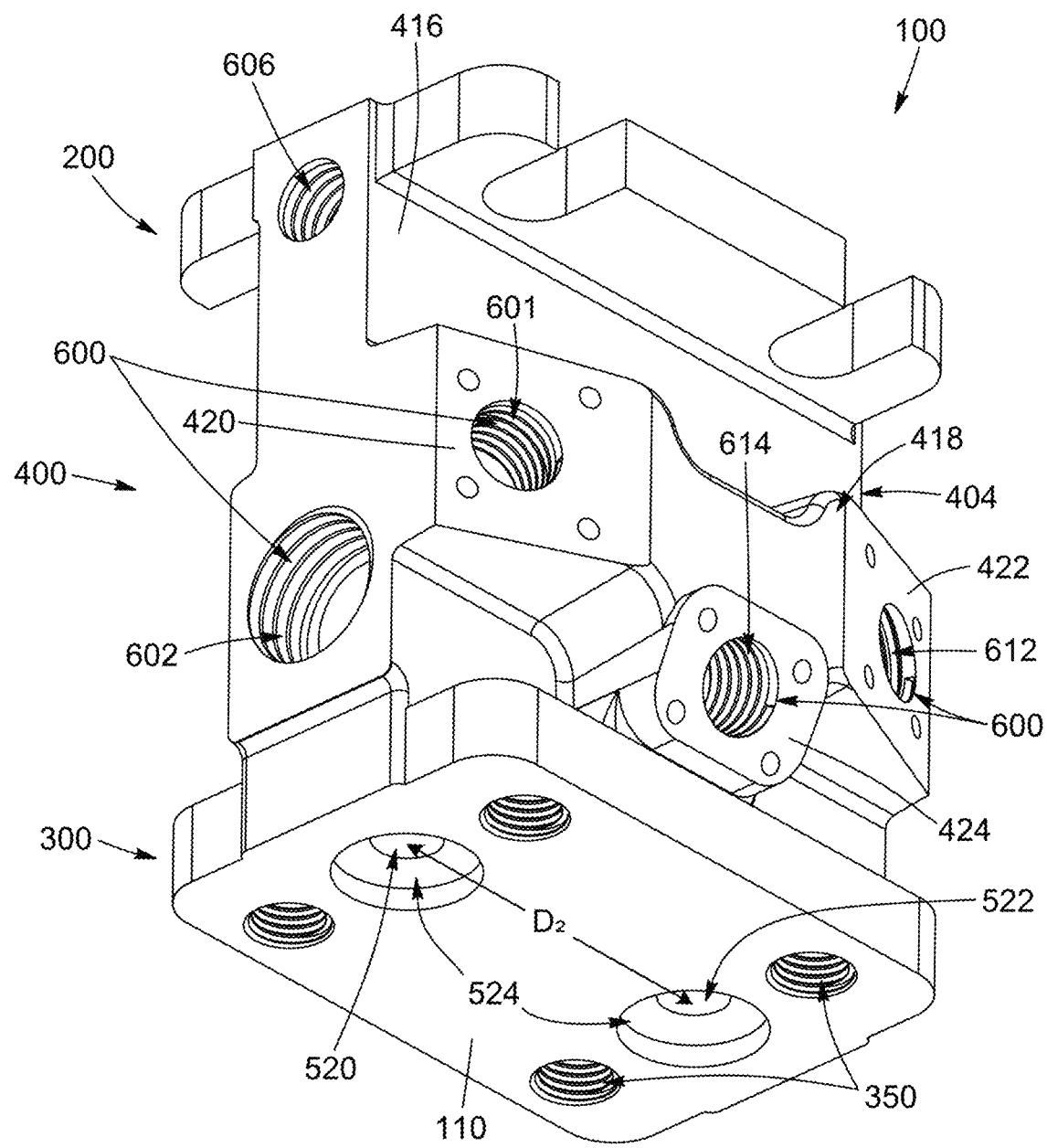
FIG. 2 is a bottom, second side perspective view of the manifold illustrated in FIG. 1.
Figure 3:
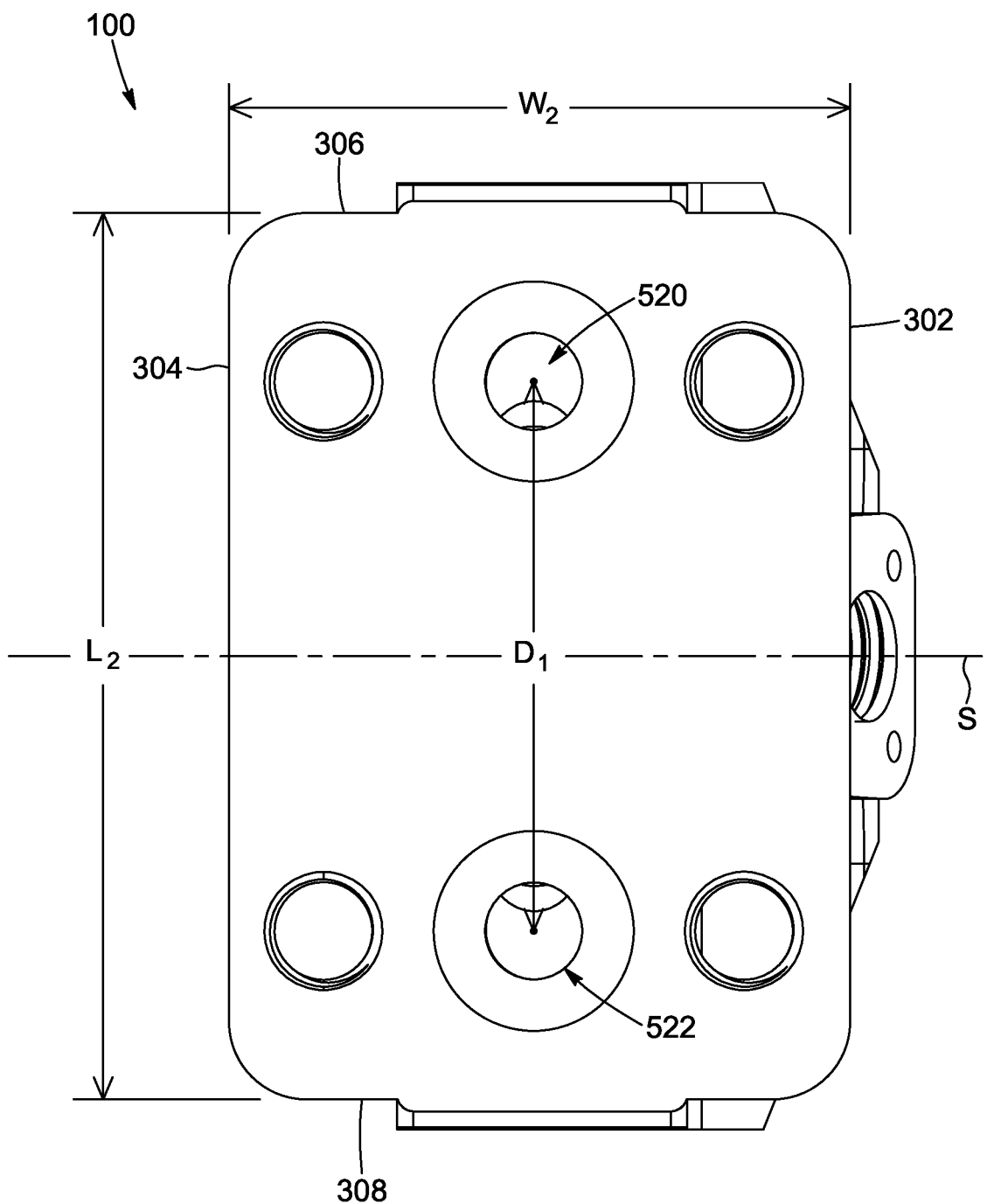
FIG. 3 is a bottom plan view of the manifold illustrated in FIG. 1.
Figure 4:
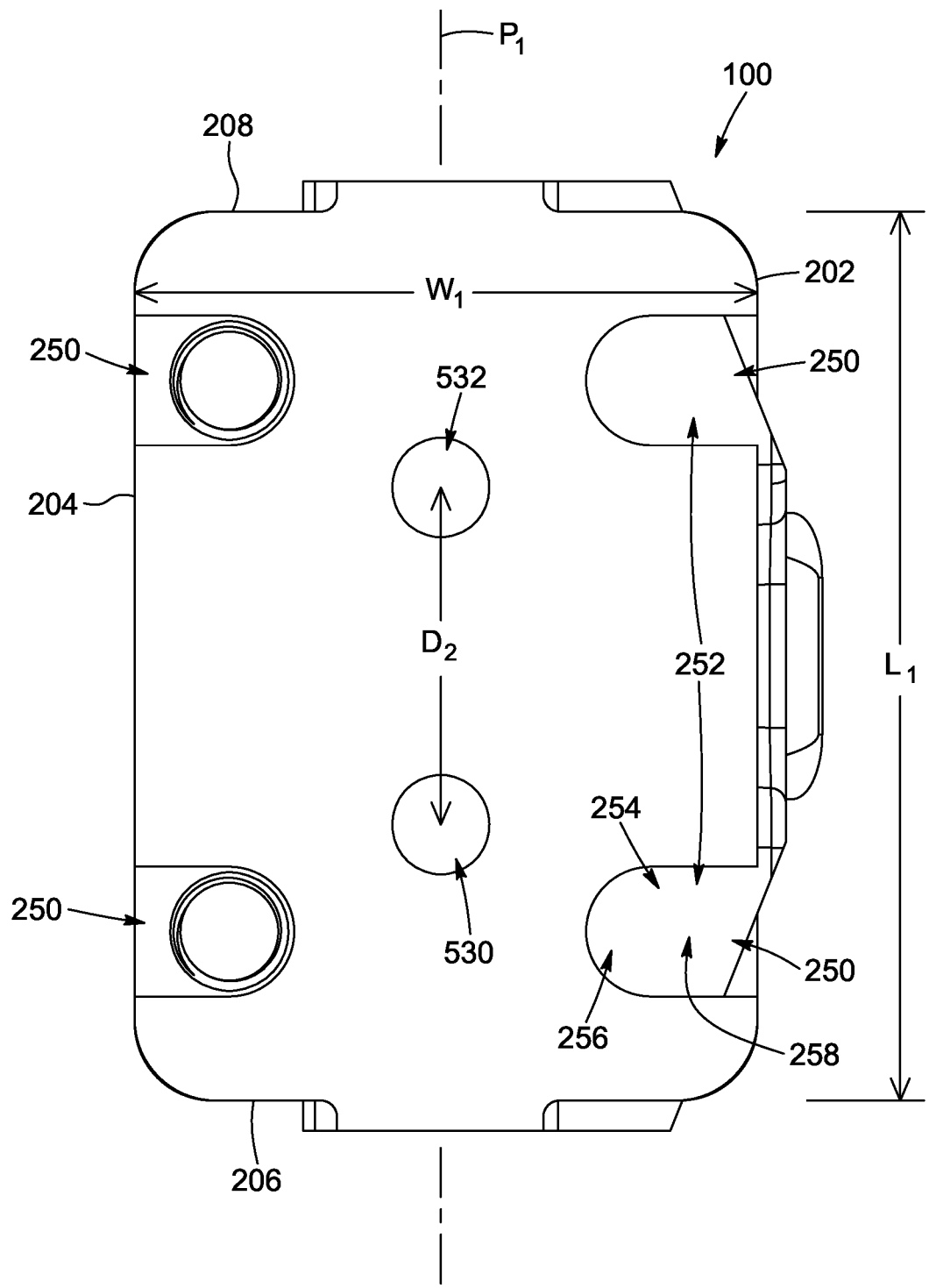
FIG. 4 is a top plan view of the manifold illustrated in FIG. 1.

As best shown in FIG. 2, in the illustrated embodiment, the inlet openings 520, 522 and the outlet openings 530, 532 are spaced apart by different distances. Specifically, the inlet openings 520, 522 are spaced from each other by a first inter-opening distance $D_1$ and the outlet openings 530, 532 are spaced from each other by a second inter-opening distance $D_2$. It will be understood that the first and second inter-opening distances $D_1$, $D_2$ correspond to center-to-center distances between the inlet openings 520, 522 and the outlet openings 530, 532.

In the illustrated embodiment, the first inter-opening distance $D_1$ is greater than the second inter-opening distance $D_2$, such that the inlet openings are spaced further apart than the outlet openings. More specifically, in one embodiment, the inlet openings 520, 522 are spaced apart by a first inter-opening distance $D_1$ of more than 2 inches, or specifically of between about 2 inches and 2¼ inches, or more specifically of about 2⅛ inches. Alternatively, the inlet openings 520, 522 may be spaced apart by any other suitable inter-opening distance.

In one embodiment, the outlet openings 530, 532 are spaced-apart by a second inter-opening distance $D_2$ of less than 1.5 inches, or specifically of between about 0.5 inch and 1.5 inches, or more specifically of about 1.3 inches. Alternatively, the outlet openings 530, 532 may be spaced apart by any other suitable inter-opening distance.

It will be appreciated that providing a first inter-opening distance $D_1$ being different than the second inter-opening distance $D_2$ may allow the coupling of an otherwise incompatible or unsuitable pressure transmitter to a fluid flowline.

Figure 8:
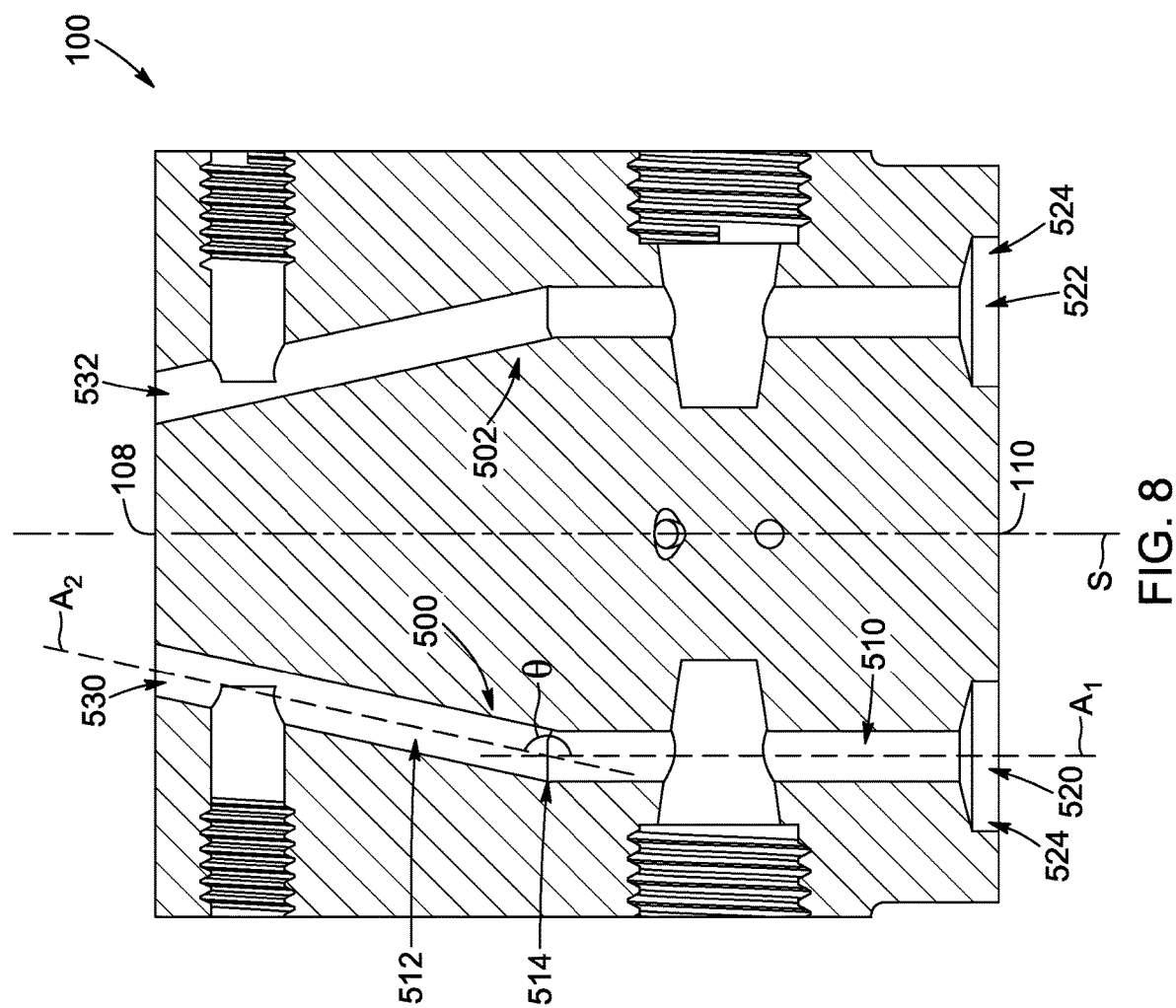
FIG. 8 is a cross-sectional view, taken along cross-section line A-A, of the manifold illustrated in FIG. 1.

As shown in FIG. 8, in the illustrated embodiment, the fluid conduits 500, 502 do not extend along a straight line between the inlet openings 520, 522 and the outlet openings 530, 532. Specifically, each fluid conduit 500, 502 includes an inlet-side conduit segment 510 located towards the corresponding inlet opening 520, 522 and an outlet-side conduit segment 512 located towards the corresponding outlet opening 530, 532. Each conduit segment 510, 512 is substantially straight and the inlet-side and outlet side conduit segments 510, 512 are angled relative to each other to form an elbow 514 between the two segments 510, 512.

In the illustrated embodiment, the first conduit segments 510 of the two fluid conduits 500, 502 extend substantially parallel to each other. More specifically, each first conduit segment 510 has a first segment axis $A_1$, and the first conduit segments 510 are oriented such that the first segment axes $A_1$ of the two fluid conduits 500, 502 extend substantially parallel to each other and substantially orthogonal to the flowline-side body face 110. Each second conduit segment 512 has a second segment axis $A_2$ which is angled relative to the first segment axis $A_1$. It will be appreciated that the substantially straight positioning of the first conduit segments 510 relative to the flowline-side planar portion 412 may facilitate cleaning or maintenance of said first conduit segments 510.

Still in the illustrated embodiment, the manifold body 102 is substantially symmetrical about a symmetry plane S extending substantially parallel to the short sides 206, 208, 306, 308 of the transmitter-side and flowline-side flanges 200, 300 and located substantially midway between the short sides 206, 208, 306, 308. In this configuration, the second conduit segments 512 of both the first and second fluid conduits 500, 502 are angled towards the opposite fluid conduit 500, 502 at the same elbow angle θ such that the two fluid conduits 500, 502 are mirror images of each other. In one embodiment, the outlet-side conduit segment 512 of the first and second fluid conduits 500, 502 are angled towards the opposite fluid conduit 500, 502 at an elbow angle θ of less than 180°, or specifically between about 95° and 175°, or more specifically of about 166.7°. Alternatively, the first and second conduit segments 510, 512 could be angled relative to each other at any other suitable angle. It will be appreciated that the length of the first conduit segment 510 and the elbow angle θ of the elbow 514 define the difference between the first and second inter-opening distances $D_1$ and $D_2$.

In another embodiment, each conduit 500, 502 may include more than two conduit segments which may be angled relative to each other. In yet another embodiment, one or more of the conduit segments could be curved instead of being straight. In still another embodiment, the two fluid conduits 500, 502 may not be mirror images of each other and may instead be configured differently.

In the illustrated embodiment, each inlet opening 520, 522 is further provided with a counterbore 524 extending into the flowline-side body face 110. Alternatively, the inlet openings 520, 522 may not be provided with counterbores. In one embodiment, the outlet openings could also include counterbores. Alternatively, the manifold body 102 may not include any counterbores.

In the illustrated embodiment, the central body portion 400 of the manifold body 102 includes first and second lateral sides 402, 404 extending opposite each other, and third and fourth lateral sides 406, 408 extending opposite each other.

In the illustrated embodiment, each one of the first and second lateral sides 402, 404 has a width that is substantially similar to the lengths $L_1$, $L_2$ of the transmitter-side and flowline-side flanges 200, 300, while the third and fourth lateral sides 406, 408 have a width which is substantially smaller than the widths W1, W2 of the transmitter-side and flowline-side flanges 200, 300.

In the illustrated embodiment, the first lateral side 402 is not entirely planar and instead includes transmitter-side and flowline-side planar portions 410, 412 that are substantially planar and extend substantially parallel to each other, but that are offset relative to each other to define a shoulder 414 between the transmitter-side and flowline-side planar portions 410, 412. The second lateral side 404 is also not entirely planar and includes a planar base portion 416 and a raised portion 418 which extends away from the base portion 416. In the illustrated embodiment, the raised portion 418 includes first, second and third faces 420, 422, 424 which are planar and are angled relative to the base portion 416, with the third face 424 being located between the first and second faces 420, 422. Still in the illustrated embodiment, the third and fourth lateral sides 406, 408 are substantially planar and extend substantially parallel to each other.

Figure 12:
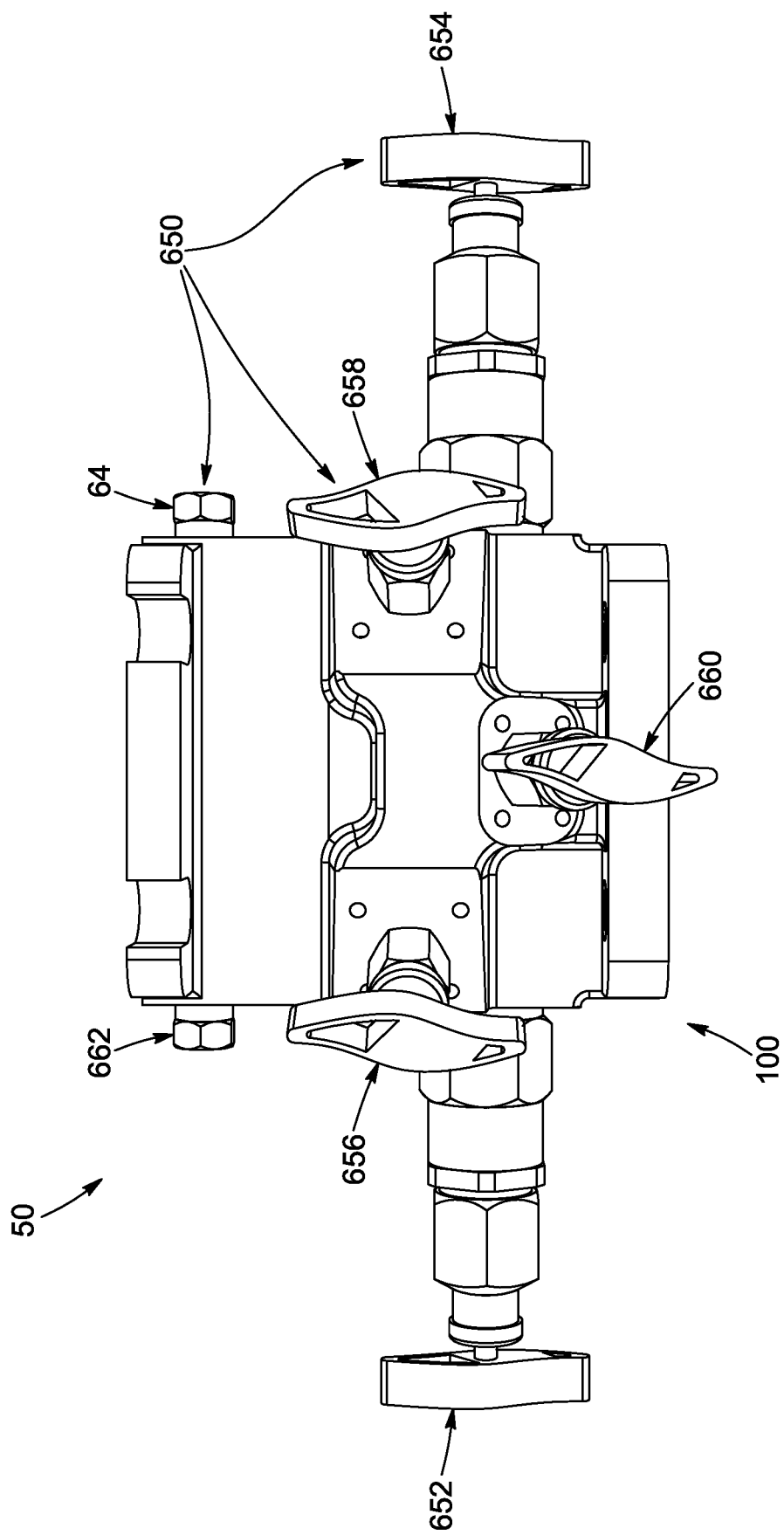
FIG. 12 is a photograph showing a manifold assembly, in accordance with one embodiment, comprising the manifold illustrated in FIG. 1 and a plurality of valves operatively coupled to the manifold.

The manifold 100 further includes a plurality of ports or valve bores 600 defined in the manifold body 102 to receive valves for controlling fluid flow within the manifold 100. For example, FIG. 12 shows a manifold assembly 50 which includes the manifold 100 and a plurality of valves 650 coupled to the manifold body 102. In the illustrated embodiment, the valves 650 include first and second isolation valves 652, 654 in communication with the first and second fluid conduits 500, 502 to selectively open and close the corresponding fluid conduit 500, 502. The valves 650 further include first and second equalizing valves 656, 658 to selectively open and close corresponding first and second equalizing conduits 560, 562 allowing communication between the first and second fluid conduits 500, 502. Finally, the valves 650 include a vent valve 660 in fluid communication with the first and second equalizing conduits 560, 562.

Figure 9:
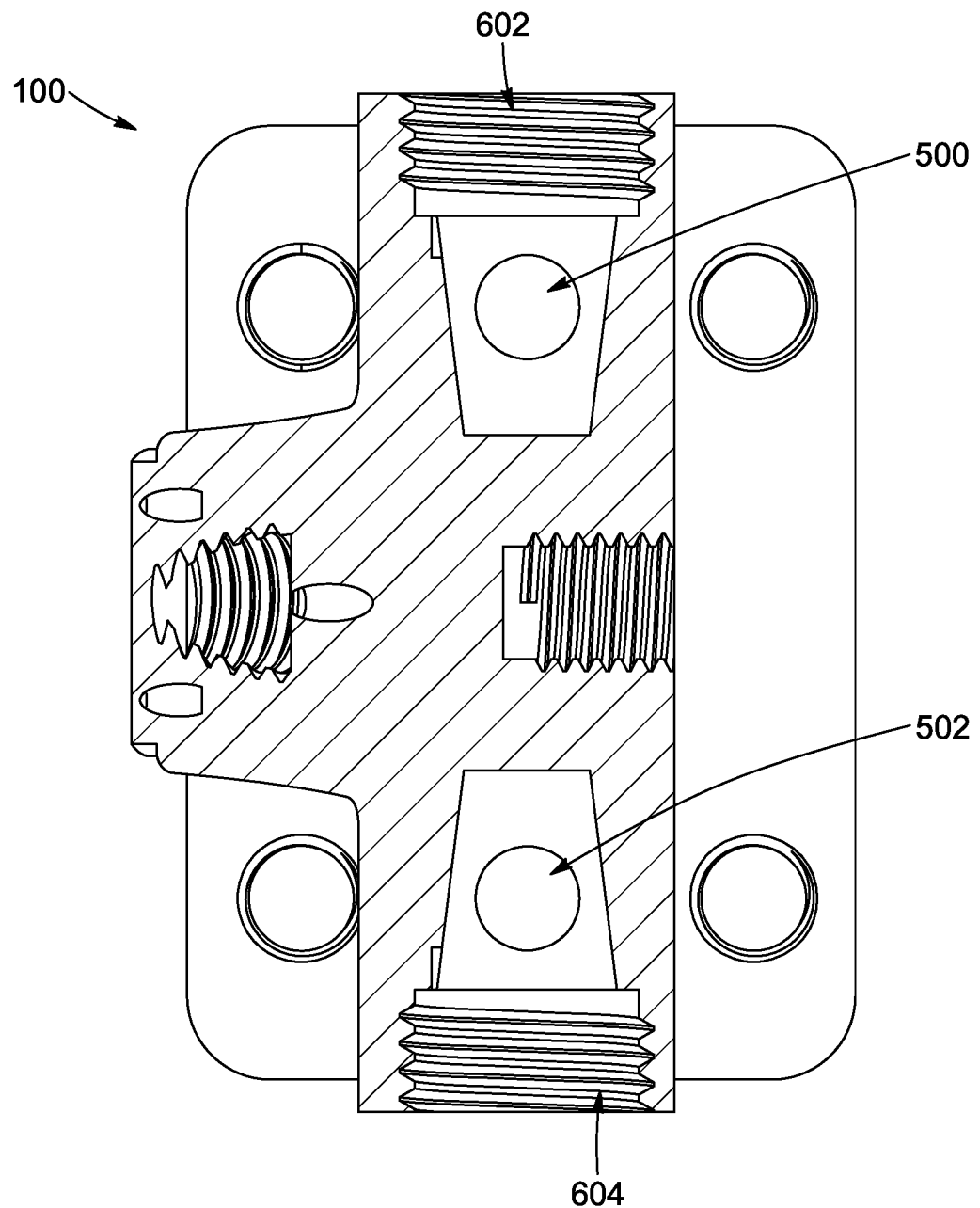
FIG. 9 is another cross-sectional view, taken along cross-section line B-B, of the manifold illustrated in FIG. 1.
Figure 10:
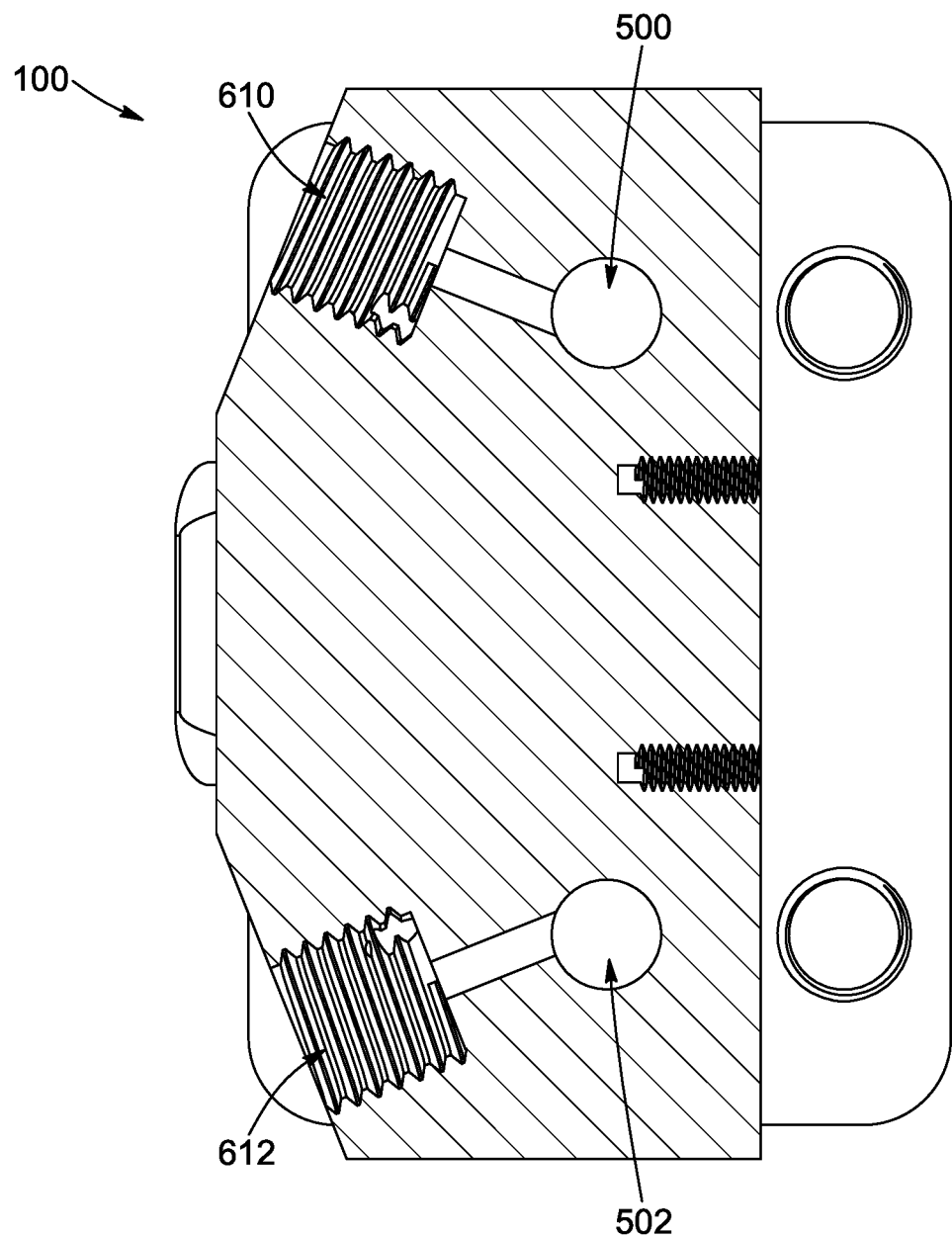
FIG. 10 is a cross-sectional view, taken along cross-section line C-C, of the manifold illustrated in FIG. 1.

In the illustrated embodiment, the valve bores 600 includes first and second isolation valve bores 602, 604 defined in the third and fourth lateral sides 406, 408 of the central body portion 400, near the flowline-side flange 300, for receiving the isolation valves 652, 654. In a preferred embodiment, the first and second isolation valve bores 602, 604 intersect the first and second fluid conduits 500, 502 along the first conduit segments 510. An orthogonal intersection of the isolation valves 652, 654 within the first and second fluid conduits 500, 502 may provide a more effective obstruction of said first and second fluid conduits 500, 502 when exposed to a high-pressure fluid flow. As best shown in FIG. 9, the isolation valve bores 602, 604 are tapered, but could instead be cylindrical.

In the illustrated embodiment, the valve bores 600 further include first and second plug bores 606, 608 also defined in the third and fourth lateral sides 406, 408, near the transmitter-side flange 200, for receiving first and second plugs 662, 664. The first and second plugs 662, 664 may provide fluid access to the first and second fluid conduits 500, 502 for the exhausting, collection or sampling of the fluid.

Figure 5:
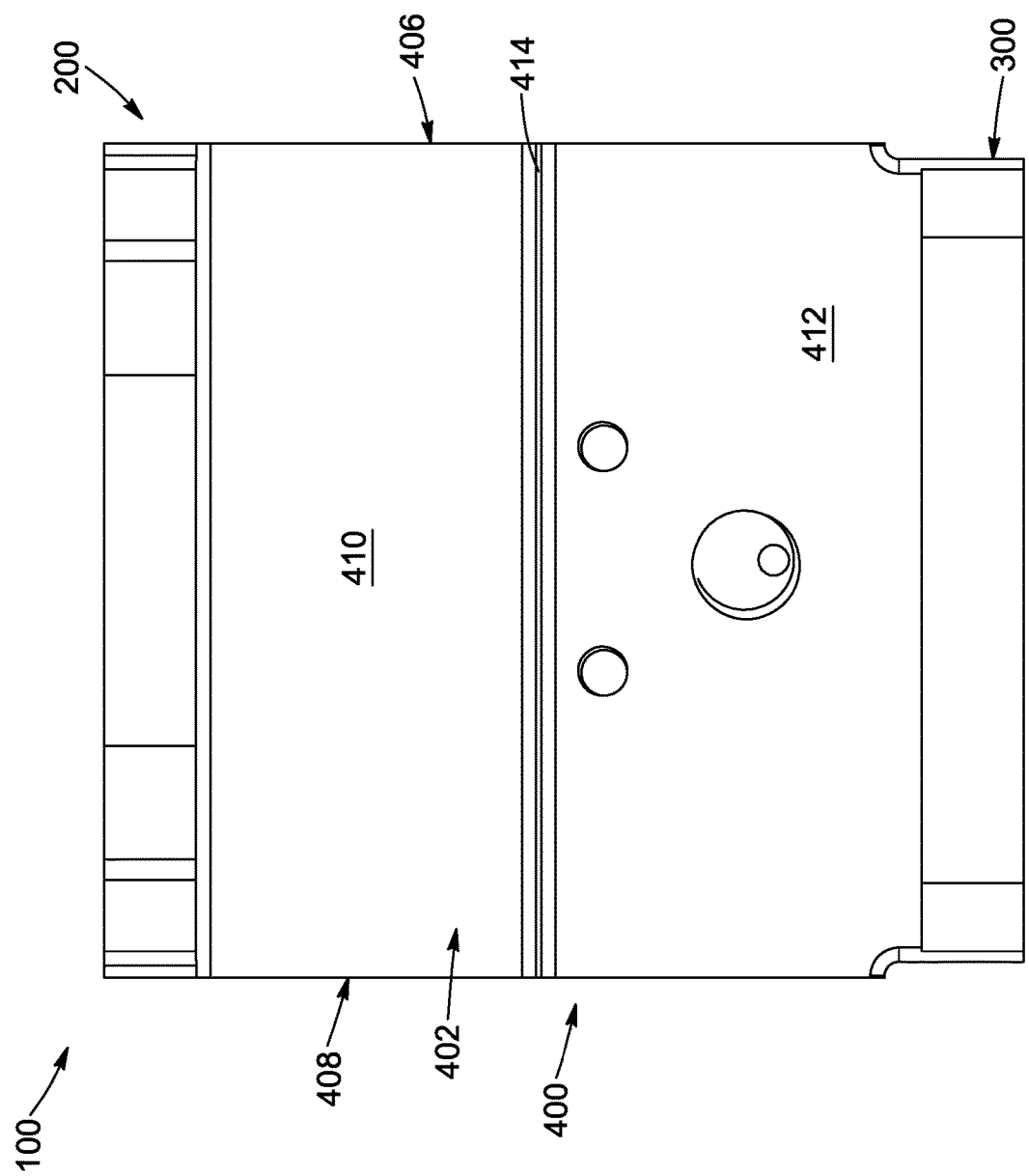
FIG. 5 is a first long side elevation view of the manifold illustrated in FIG. 1.
Figure 6:
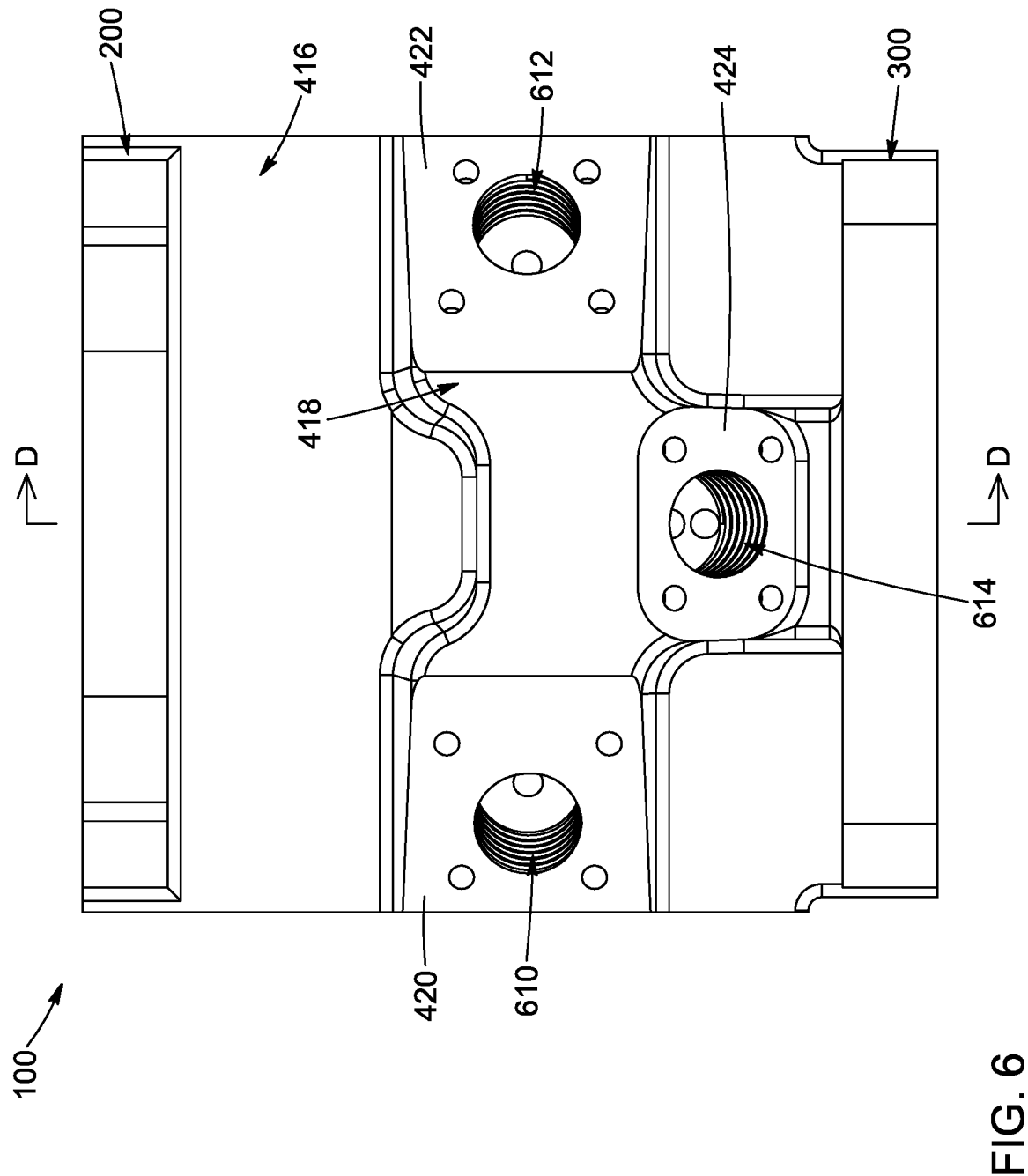
FIG. 6 is a second long side elevation view of the manifold illustrated in FIG. 1.
Figure 7:
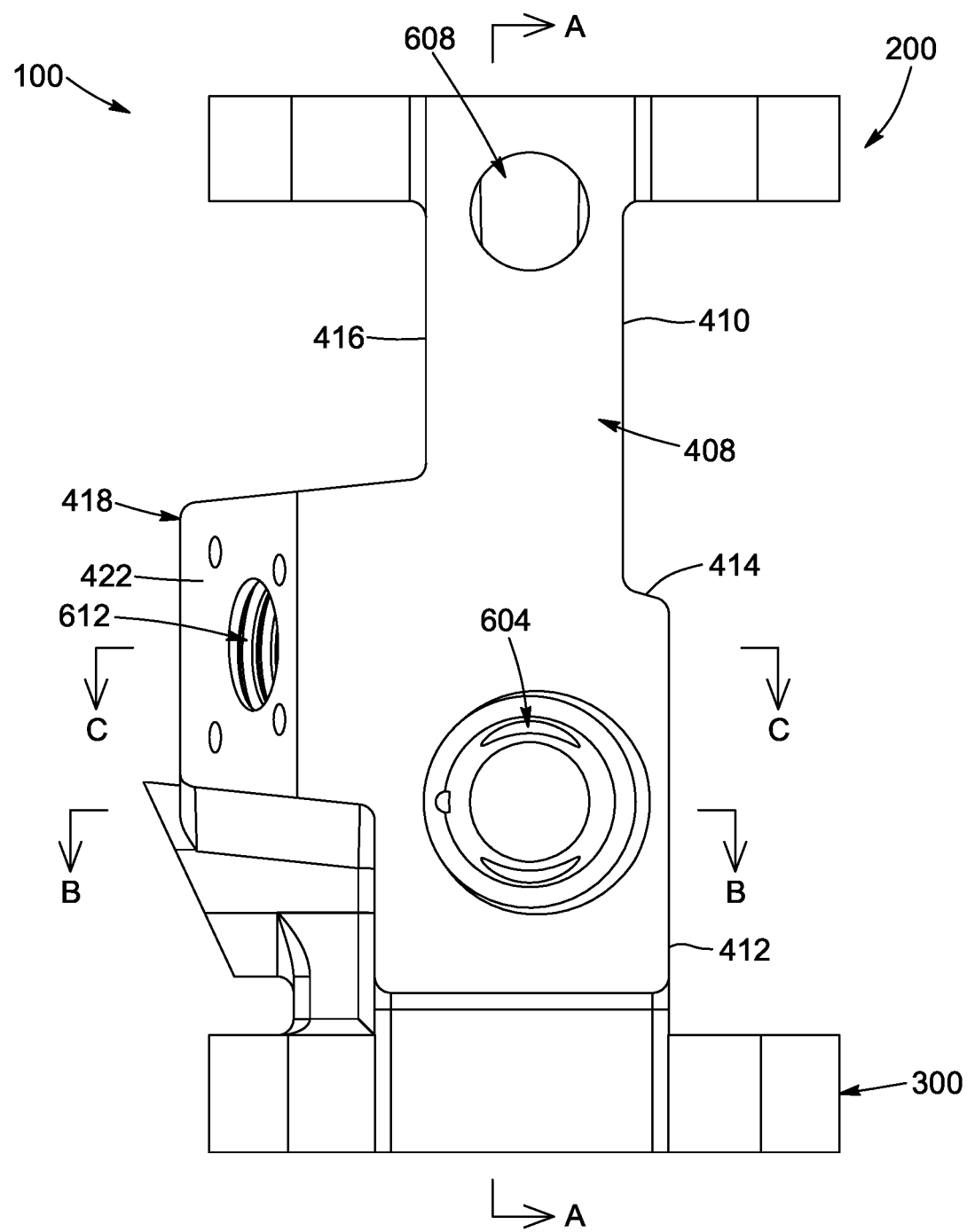
FIG. 7 is a short side elevation view of the manifold illustrated in FIG. 1.
Figure 11:
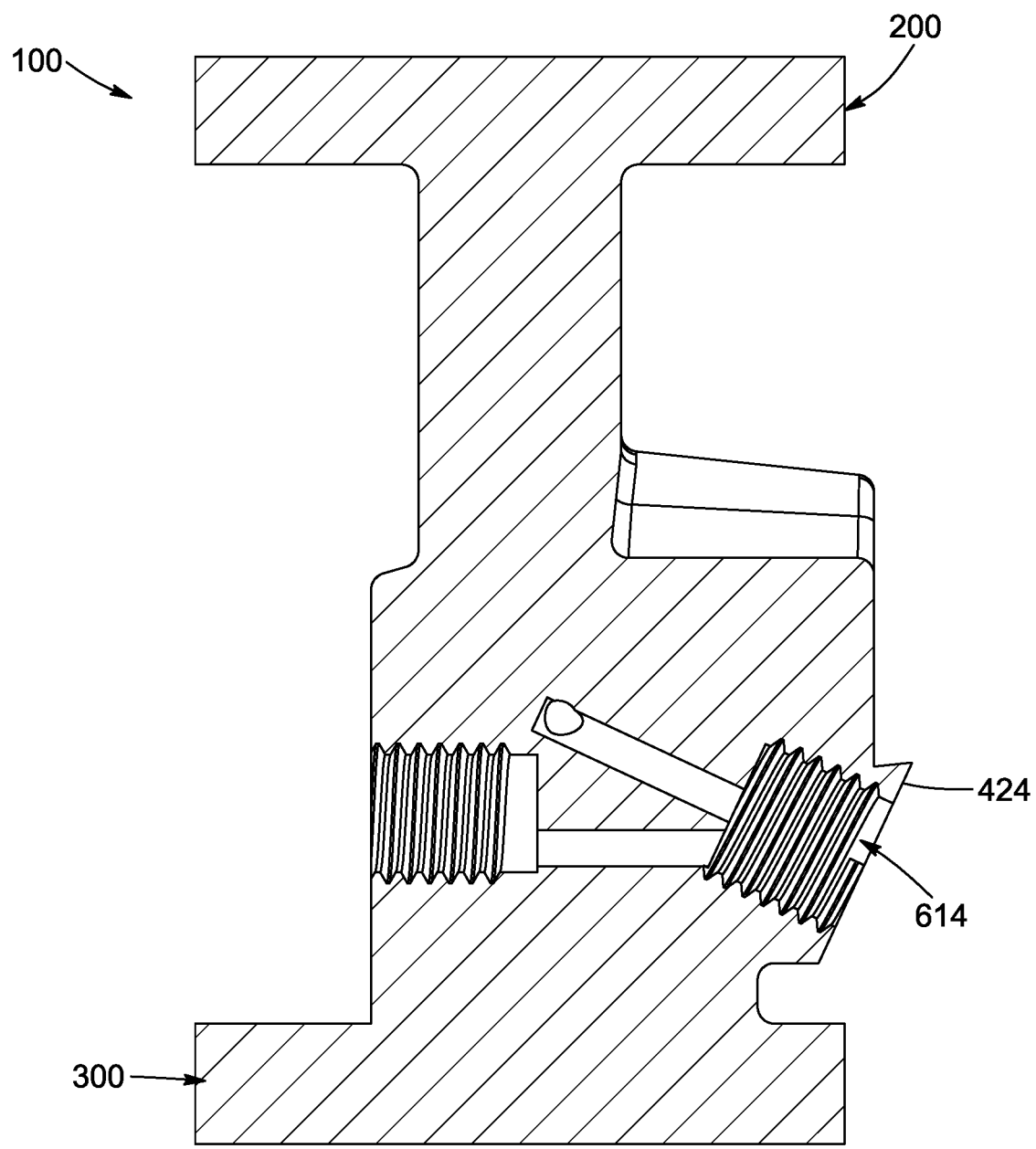
FIG. 11 is a cross-sectional view, taken along cross-section line D-D, of the manifold illustrated in FIG. 1.

In the illustrated embodiment, the valve bores 600 further include first and second equalizing bores 610, 612 for receiving the equalizing valves 656, 658 and a vent bore 614 for receiving the vent valve 660. Specifically, the first and second equalizing bores 610, 614 are defined in the first and second faces 420, 422 of the raised portion 418 and the vent bore 614 is defined in the third face 424 of the raised portion 418. Referring to FIGS. 5 and 11, the manifold 100 further comprises a vent port 668 on the flowline-side planar portion 412 opposite the vent bore 614. The vent port 668 may be in fluid communication with the first and second equalizing conduits 560, 562 when the vent valve 660 is in an open configuration.

It will be understood that the above description of the bores 600 is merely provided as an example and that bores 600 and valves 650 could be positioned and configured according to any suitable configuration.

It will be appreciated that a closing of the first and second isolation valves 652, 654 as well as the first and second equalizing valves 656, 658 may allow a selective isolation of the outlet-side conduit segment 512 for zero-pressure testing of the pressure transmitter.

In the illustrated embodiment, the valve bores 600 are threaded to receive a similarly-threaded portion of the corresponding valve 650. Alternatively, the valve bores 600 could be unthreaded and instead be configured to be coupled to the valves 650 using other coupling types.

Figure 13:
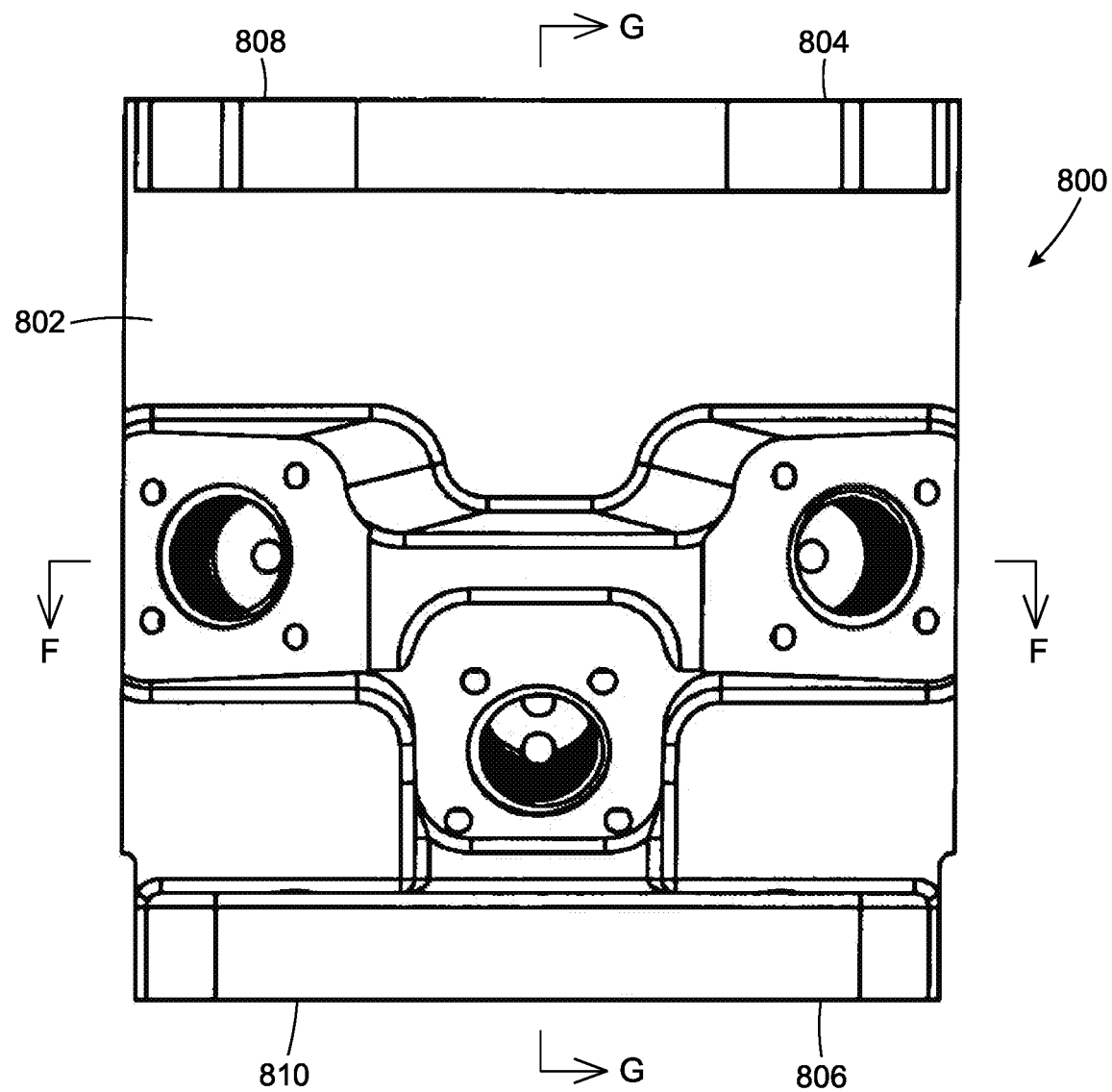
FIG. 13 is a long side elevation view of a manifold for use with a pressure transmitter, in accordance with a second embodiment.
Figure 14:
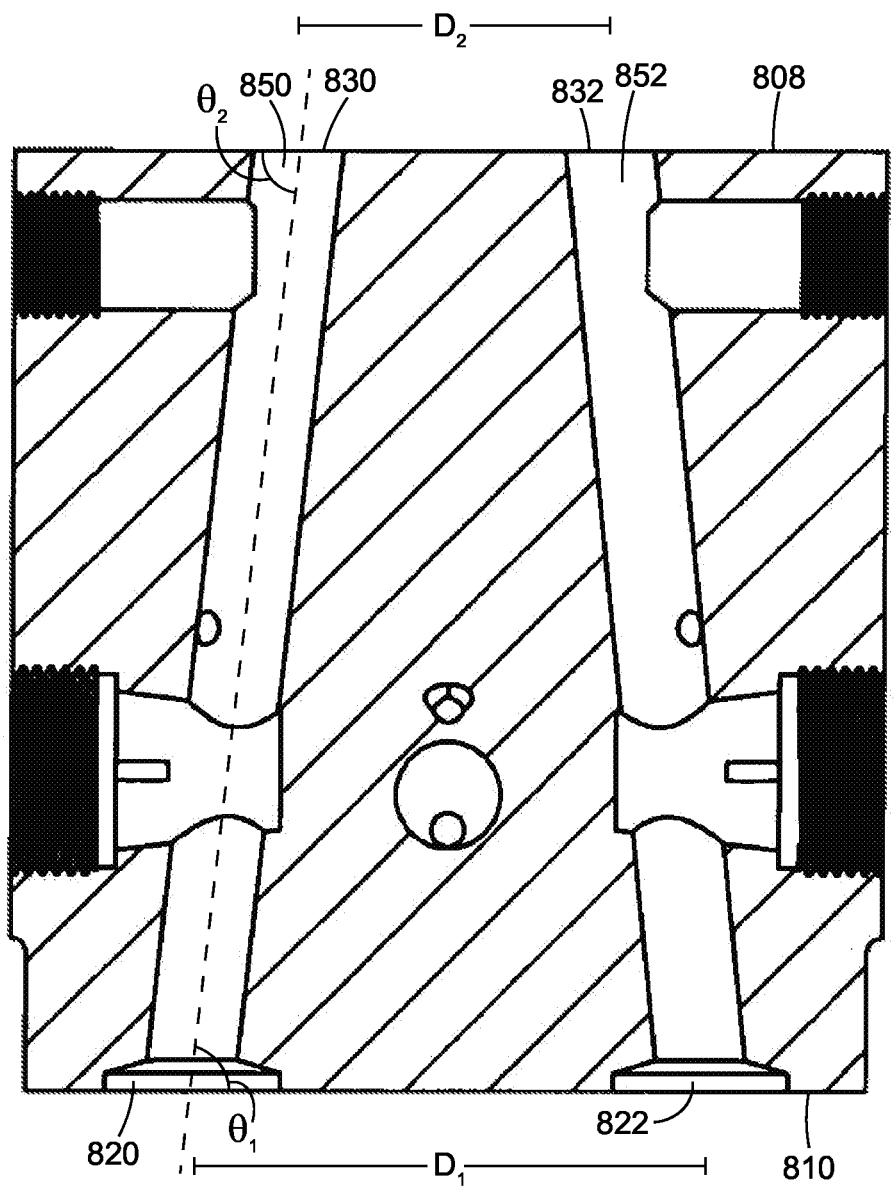
FIG. 14 is a cross-sectional view, taken along cross-section line E-E, of the manifold illustrated in FIG. 13.
Figure 15:
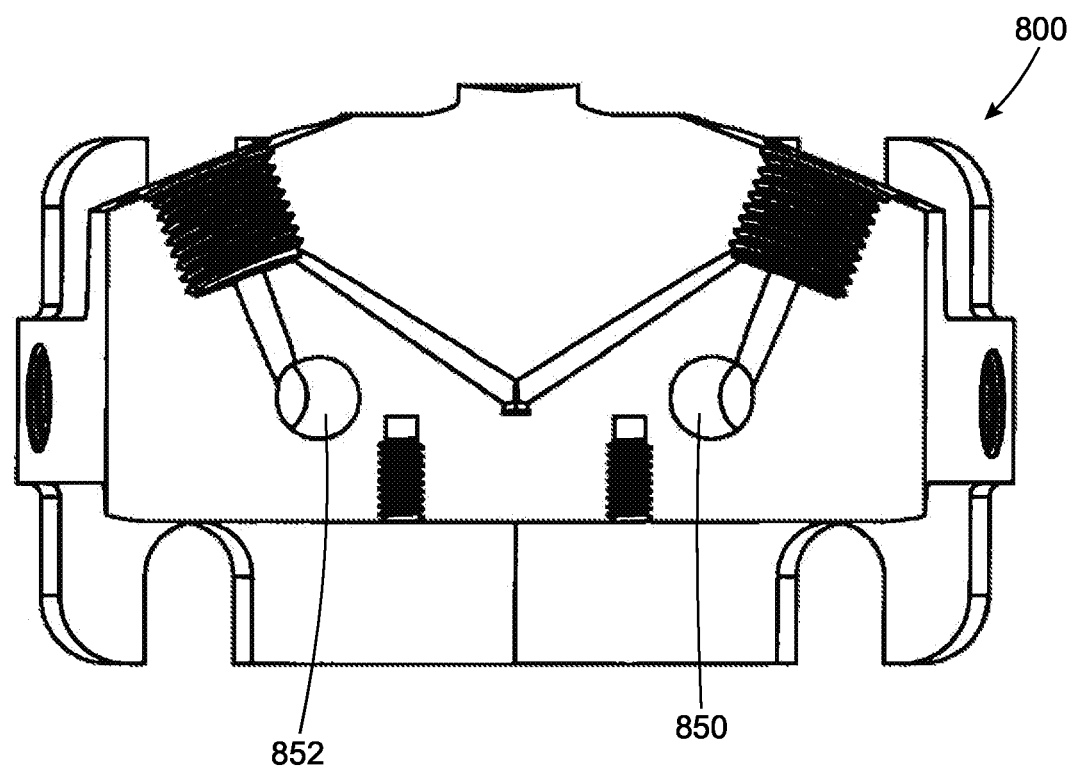
FIG. 15 is a cross-sectional view, taken along cross-section line F-F, of the manifold illustrated in FIG. 13.

Referring now to FIGS. 13 to 15, there is there is shown a second embodiment of a manifold 800 for use with a pressure transmitter (not shown). The manifold 800 similarly usable to couple the pressure transmitter to a fluid flowline (not shown) carrying pressurized fluid and provide fluid communication between the pressure transmitter and the fluid flowline.

In the illustrated embodiment, the manifold 800 includes a manifold body 802 which extends between a first end 804 and a second end 806. In one embodiment, the first end 804 is connectable to the pressure transmitter and the second end 804 is connectable to the fluid flowline.

Specifically, the manifold body 802 includes a transmitter-side body face 808 located at the first end 804 and configured to interface with a corresponding face of the pressure transmitter, and a flowline-side body face 810 located at the second end 806 and configured to interface with a corresponding face of the fluid flowline.

Figure 16:
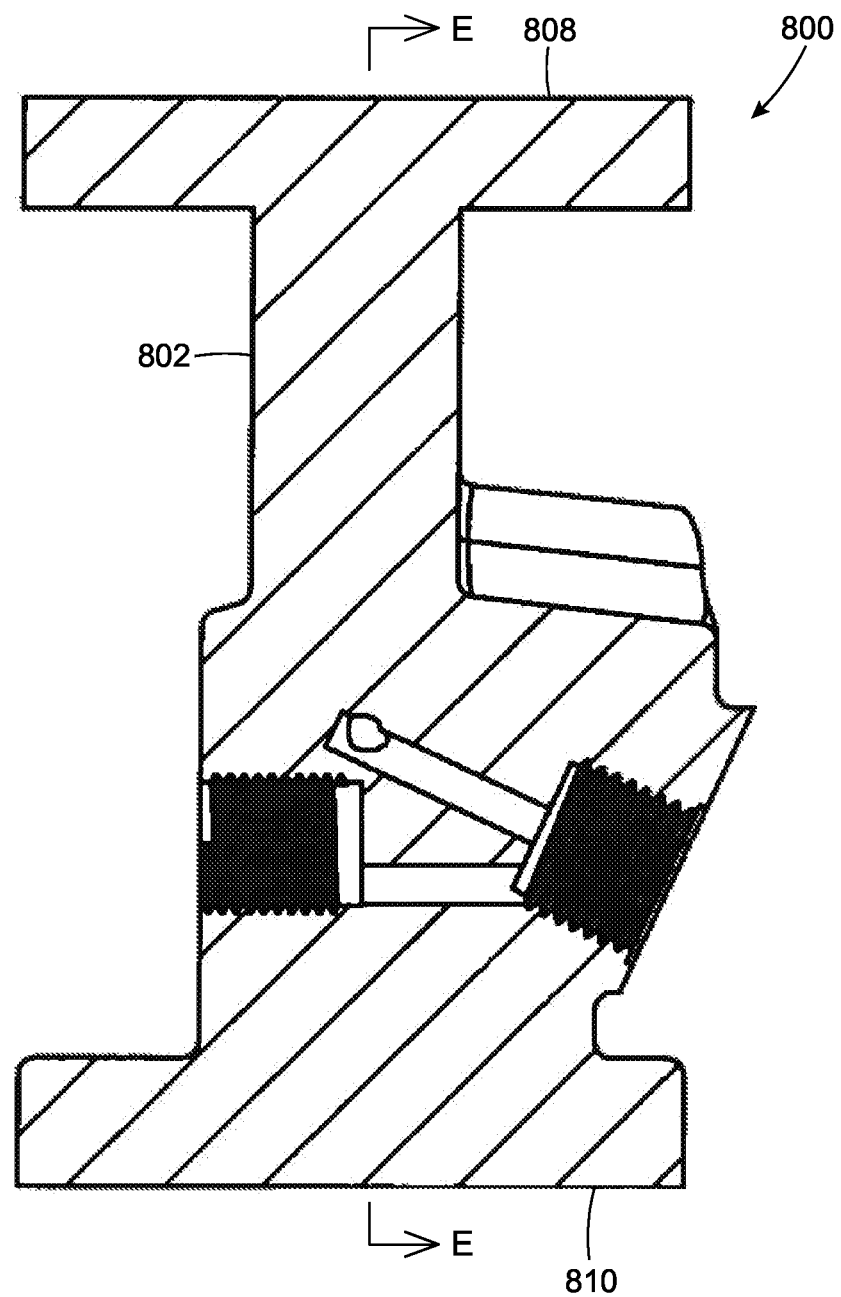
FIG. 16 is a cross-sectional view, taken along cross-section line G-G, of the manifold illustrated in FIG. 13.

Referring now to FIGS. 14 to 16, the manifold 800 further includes a plurality of fluid conduits 850, 852 for allowing passage of fluid from the fluid flowline to the pressure transmitter. The fluid conduits 850, 852 extend between the first and second ends 804, 806 of the manifold body 802, and more specifically between the transmitter-side and flowline-side body faces 808, 810. Specifically, the manifold 800 includes a plurality of inlet openings 820, 822 defined on the flowline-side body face 810 and a plurality of outlet openings 830, 832 defined on the transmitter-side body face 808. In the illustrated embodiment, the inlet openings include first and second inlet openings 820, 822 and the outlet openings include first and second outlet openings 830, 832. Still in the illustrated embodiment, the plurality of conduits 850, 852 includes a first fluid conduits 850, 852 extending between the first and second ends of the manifold body 802, 804.

As best shown in FIG. 14, in the illustrated embodiment, the inlet openings 820, 822 and the outlet openings 830, 832 are spaced apart by different distances. Specifically, the inlet openings 820, 822 are spaced from each other by a first inter-opening distance $D_1$ and the outlet openings 830, 832 are spaced from each other by a second inter-opening distance $D_2$. It will be understood that the first and second inter-opening distances $D_1$, $D_2$ correspond to center-to-center distances between the inlet openings 820, 822 and the outlet openings 830, 832. In the illustrated embodiment, the first inter-opening distance $D_1$ is greater than the second inter-opening distance $D_2$, such that the inlet openings are spaced further apart than the outlet openings. Once again, it will be appreciated that providing a first inter-opening distance $D_1$ being different than the second inter-opening distance $D_2$ may allow the coupling of an otherwise incompatible or unsuitable pressure transmitter to a fluid flowline.

As shown in FIG. 14, in the illustrated embodiment, the fluid conduits 850, 852 extend along a straight line between the inlet openings 820, 822 and the outlet openings 830, 832. Specifically, each fluid conduit 850, 852 includes a single conduit segment 855 being substantially straight and extending between the inlet openings 820, 822 and the outlet openings 830, 832. It may be appreciated that the substantially straight conduit segment 855 may facilitate a manufacturing of the manifold 800 by requiring a single bore operation during the formation of the fluid conduits 850, 852.

In the illustrated embodiment, the conduit segments 850 of the two fluid conduits 850, 852 are mirrored and extend at an angle $\theta_1$ and an angle $\theta_2$ relative to the transmitter-side and flowline-side body faces 808, 810, respectively. It will be appreciated that, when the transmitter-side and flowline-side body faces 808, 810 are parallel, the angles $\theta_1$, $\theta_2$ are equivalent.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

What is claimed is:

1. A manifold comprising:
a manifold body having a first end and a second end;
a first fluid conduit and a second fluid conduit extending through the manifold body and each having an inlet for coupling to a fluid flowline and an outlet for coupling to a pressure transmitter;
first and second isolation valve bores in fluid communication with the first and second fluid conduits, respectively; and
a first equalizing bore in fluid communication with at least one of the first and second fluid conduits;
wherein the inlet openings are spaced from each other by a first inter-opening distance, and the outlet openings are spaced from each other by a second inter-opening distance, the first inter-opening distance being different from the second inter-opening distance.

2. The manifold of claim 1, wherein the first inter-opening distance is greater than the second inter-opening distance.

3. The manifold of claim 1, wherein each of the first and second fluid conduits comprises an inlet-side conduit segment extending form the first end and wherein the inlet-side conduit segments are parallel to each other, and an outlet-side conduit segment that extends toward the second end and wherein the outlet-side conduit segments are angled inwardly toward each other.

4. The manifold of claim 3, further comprising first and second plug bores in fluid communication with the outlet-side conduit segment of the respective first fluid conduit and the second fluid conduit.

5. The manifold of claim 3, wherein the first fluid conduit is a mirror image of the second fluid conduit.

6. The manifold of claim 3, wherein the outlet-side conduit segments are angled towards each other at an angle being between 160° and 170°.

7. The manifold of claim 3, wherein each of the first and second isolation valve bores communicates with the inlet-side conduit segment of the respective first fluid conduit and the second fluid conduit.

8. The manifold of claim 7, wherein the first and second isolation valve bores extend through and beyond the inlet-side conduit segment of the respective first fluid conduit and the second fluid conduit and into the manifold body.

9. The manifold of claim 1, wherein each of the first and second fluid conduits extends along a straight line between the inlet openings and the outlet openings.

10. The manifold of claim 1, further comprising a second equalizing bore in fluid communication with at least one of the first and second fluid conduits.

11. The manifold of claim 10, further comprising a vent bore in fluid communication with the first and second equalizing bores.

12. The manifold of claim 11, further comprising a vent aperture in fluid communication with the vent bore.

13. The manifold of claim 1, wherein the first isolation valve bore and a first plug bore extend into the manifold body from a first same face of the manifold body, and the second isolation valve bore and a second plug bore extend into the manifold body from a second same face of the manifold body that is opposed to the first same face.

14. The manifold of claim 13, wherein the first and second isolation valve bores are located proximate to the first end of the manifold body that is an inlet end, and the first and second plug bores are located proximate to the second end of the manifold body that is an outlet end.

15. A method of measuring pressure within a fluid flowline, the method comprising utilizing the manifold as described in claim 1 coupled to the fluid flowline and at least one pressure transmitter; wherein inlet flowlines are respectively coupled to the inlet openings, outlet fluid flowlines are respectively coupled directly to the outlet openings without an adapter between the outlet openings and the outlet fluid flowlines, and the outlet fluid flowlines are in fluid communication with the pressure transmitter.

16. A system for measuring pressure within a fluid flowline, the system comprising:
the manifold as described in claim 1;
inlet flowlines respectively coupled to the inlet openings of the manifold for providing fluid thereto; and
outlet fluid flowlines respectively coupled directly to the outlet openings of the manifold without an adapter therebetween, the outlet fluid flowlines being in fluid communication with the pressure transmitter for providing fluid thereto.

17. A method of manufacturing a manifold, the method comprising:
providing a manifold body; and
boring a first fluid conduit and a second fluid conduit through the manifold body;
wherein boring the first and second fluid conduits comprises:
boring first and second parallel inlet-side conduit segments into a flowline-side body face of the manifold body; and
boring first and second angled outlet-side conduit segments into a transmitter-side body face of the manifold body to intersect the first and second parallel inlet-side conduit segments.

18. The method of claim 17 further comprising boring first and second isolation valve bores to fluidly communicate with the first and second parallel inlet-side conduit segments, respectively.

19. The method of claim 17 further comprising boring first and second plug bores to fluidly communicate with the first and second angled outlet-side conduit segments, respectively.

20. The method of claim 17, wherein boring the first and second angled outlet-side conduit segments comprises boring the first and second angled outlet-side conduit segments away from each other.

* * * * *